United States Patent
Patil et al.

(10) Patent No.: US 10,687,279 B2
(45) Date of Patent: Jun. 16, 2020

(54) SYSTEM AND METHOD OF OPTIMIZING USER EQUIPMENT REACHABILITY NOTIFICATIONS

(71) Applicant: Verizon Patent and Licensing Inc., Basking Ridge, NJ (US)

(72) Inventors: Sudhakar Reddy Patil, Flower Mound, TX (US); Suzann Hua, Walnut Creek, CA (US); Ye Huang, San Ramon, CA (US); Brian Olson, Clayton, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 96 days.

(21) Appl. No.: 15/687,285

(22) Filed: Aug. 25, 2017

(65) Prior Publication Data

US 2019/0069235 A1 Feb. 28, 2019

(51) Int. Cl.
*H04W 52/02* (2009.01)

(52) U.S. Cl.
CPC ... *H04W 52/0216* (2013.01); *H04W 52/0229* (2013.01)

(58) Field of Classification Search
CPC .............................................. H04W 52/0216
See application file for complete search history.

(56) References Cited

U.S. PATENT DOCUMENTS

| | | | |
|---|---|---|---|
| 2010/0225469 A1* | 9/2010 | Yoshioka | G08B 21/0233 340/539.13 |
| 2015/0063225 A1* | 3/2015 | Kanamarlapudi | H04W 52/0229 370/329 |
| 2016/0044578 A1* | 2/2016 | Vajapeyam | H04W 52/0216 370/252 |
| 2016/0192111 A1* | 6/2016 | Choi | H04L 67/26 455/507 |
| 2016/0205625 A1* | 7/2016 | Stojanovski | H04W 52/0212 370/311 |
| 2016/0286385 A1* | 9/2016 | Ryu | H04W 68/02 |
| 2016/0353384 A1* | 12/2016 | Hu | H04W 52/0261 |
| 2017/0230817 A1* | 8/2017 | Ryu | H04W 28/02 |
| 2017/0257752 A1* | 9/2017 | Yin | H04W 8/04 |
| 2017/0366423 A1* | 12/2017 | Griot | H04L 67/10 |
| 2018/0054799 A1* | 2/2018 | Starsinic | H04W 52/0219 |
| 2018/0176979 A1* | 6/2018 | Ryu | H04W 8/08 |
| 2018/0263012 A1* | 9/2018 | Ryu | H04W 68/02 |
| 2018/0317200 A1* | 11/2018 | Kim | H04W 52/0212 |
| 2018/0324652 A1* | 11/2018 | Ryu | H04W 8/08 |
| 2018/0324754 A1* | 11/2018 | Ryu | H04W 68/02 |
| 2018/0338281 A1* | 11/2018 | Bangolae | H04W 52/0229 |

* cited by examiner

*Primary Examiner* — Andrew Lai
*Assistant Examiner* — Andrew C Lee (57) ABSTRACT

An improved method and system of optimizing handling and sending of reachability notifications for a UE is disclosed. Solutions and implementations disclosed provide an efficient mechanism for determining the timing and duration of reachability periods for a UE and as a result predicting future reachability periods. This enables sending of one notification with sufficient information to inform the network of the time periods during which the UE is reachable instead of sending a notification each time the device becomes reachable.

20 Claims, 6 Drawing Sheets

SYSTEM AND METHOD OF OPTIMIZING USER EQUIPMENT REACHABILITY NOTIFICATIONS

BACKGROUND

It is generally desirable for most Mobile Type Communications (MTC) and Internet of Things (IoT) devices to support long battery life. To achieve this and to save power, a User Equipment (UE) is configured to use one or more power saving functions. In general, when utilizing a power saving function, a UE becomes inaccessible during certain time periods. The frequency and duration of these time periods varies depending, among other things, on the type of power saving function used.

During these power saving modes, the UE may not be able to receive and/or respond to a page or other request. As a result, the UE may not be able to receive any notifications from the network. In some power saving modes, the UE may be inaccessible for long periods of time. As a result, the network may be forced to continue trying to page the UE until it becomes available. This is very inefficient for large networks with numerous UEs and can drain network resources. To avoid this, some networks (such as the 3rd Generation Partnership Project (3GPP) network) support a way for the network to notify an application server from the UE via the SCEF. However, this method is also inefficient, because in certain power saving modes, each UE may only be reachable for short periods of time, thus requiring transmission of numerous reachability notifications.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the disclosed subject matter. It will be apparent to persons of ordinary skill, upon reading this description, that various aspects can be practiced without such details.

Most UEs provide at least two power saving functions. The most commonly used power saving functions include Power Saving Mode (PSM), Discontinuous Reception (DRX) and Extended Idle Mode (eDRX). Generally, while using PSM, a UE can be paged for a period of time referred to as active timer. After the active timer expires, the UE transitions into PSM mode. In this mode, the UE is not reachable and cannot respond to paging. While in PSM mode, a UE can be unreachable for hours or days. The UE comes out of PSM mode when it wakes up and sends a Service Request (SR) or a Tracking Area Update (TAU) to the network.

In eDRX, after a UE becomes idle, it enters into a state where it becomes unreachable until a period referred to as the Paging Time Window (PTW). During a PTW, the UE can be paged and therefor it can be reached. Outside of the PTW, however, the UE cannot be reached. When the UE becomes reachable, a UE reachability indication is generally by a Mobility Management Entity (MME). For devices that utilize eDRX and/or PSM and eDRX at the same time, this could mean numerous notifications will need to be sent for each device before the device responds or is reachable. These notifications drain network resources and waste valuable processing and air interface resources. This problem may be magnified in a network where there could potentially be thousands or millions of devices.

In the present implementations, various techniques are used to implement an efficient mechanism for determining the timing and duration of reachability periods for a UE. Instead of sending a notification each time the device becomes reachable, a single notification is sent with sufficient information to inform the network of future time periods during which the UE will be reachable. This decreases the use of network resources, thus increasing the overall efficiency of the network. Moreover, these techniques help improve accuracy and efficiency of delivery of downlink data to UEs, thus improving the overall performance of both the network and the UE.

Figure 1:
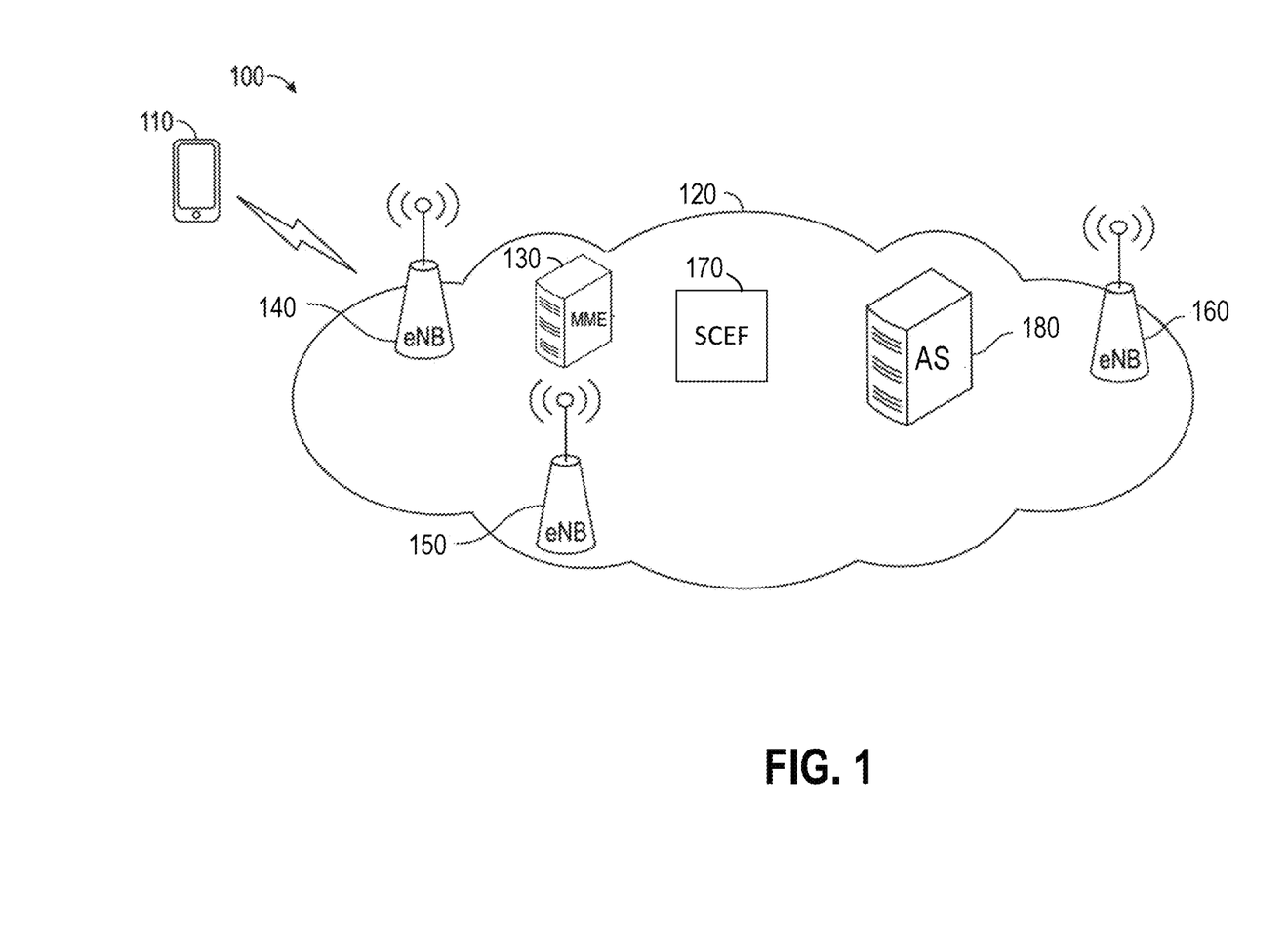
FIG. 1 illustrates a high-level functional block diagram of an example system that provide various communications and can be used to optimize UE reachability notifications, according to various aspects of this disclosure.

Referring now to the drawings, FIG. 1 illustrates a high-level functional block diagram of one implementation of a system 100 offering a variety of mobile communication services in a mobile network where the methods and systems discussed here to optimize UE reachability notifications may be utilized. The example of system 100 shows a UE 110 connected to a network 120. System 100 includes, among other features, a MME 130, which, in one implementation, is a management entity that performs signaling for the UE's access to the network. The MME 130 may also provide allocation, tracking, paging, roaming, handover of network resources, control functions, and the like. Furthermore, the MME 130 may handle functions related to subscribers and session management. In one implementation, the MME 130 also performs such functions as security procedures, device to network session handling, idle device location management, and so on. More importantly, the MME 130 may be responsible for functions such as UE reachability (including performing paging retransmission and control), Tracking Area Identity (TAI) management (for UEs in idle and active mode), roaming, authentication, and supporting message transmission.

In one implementation, the MME 130 is connected to and manages one or more base stations 140, 150, and 160. These base stations are represented as eNodeBs (eNBs) and are responsible for connecting one or more UEs, such as the UE 110 to the network 120. In one implementation, the UE 110 performs a random-access channel (RACH) procedure in order to secure a radio resource control (RRC) connection with one of the eNBs. After an RRC connection is successfully set up, the UE 110 performs a non-access stratum (NAS) procedure by sending a NAS request to the MME 130. Examples of NAS requests include attach, tracking area update (TAU), and service requests. After a UE is successfully attached to an eNB, the eNB may provide downlink or uplink transmission services to the UE.

In one implementation, the network 120 includes a Service Capability Exposure Function (SCEF) 170 which is communicatively coupled to one or more Application Servers (AS) 180. The SCEF 170 is an entity within the network 120 which provides means for safely exposing services and capabilities provided by the network interface. SCEF 170 is, in one implementation, a core entity for providing service functions by one or more trusted domains that are operated by a mobile communication operator. This includes, in one implementation, providing an API interface to a third-party service provider such as AS 180. As a result, the SCEF 170 is also responsible, in one implementation, for monitoring reachability of one or more UEs. As discussed above, UE reachability is indicative of a time period during which the UE becomes reachable in order to send or receive a mobile communication service, such as voice or data. When the UE becomes reachable, for example, when the UE wakes up from a power saving function or first attaches to an eNB, a UE reachability notification may be sent by the MME to the SCEF. In particular, a reachability notification may be sent when the UE becomes reachable, and a previous attempt by the SCEF to send downlink data failed because of UE unreachability or in situations where the SCEF has subscribed for reachability events on behalf of an AS. In one implementation, when the reachability indication is sent to the SCEF, the MME also includes an expected UE availability period referred to as Maximum UE Availability Time. The reachability indication and the Maximum UE Availability Time may then be sent by the SCEF to the AS to provide it with a window of time to reach the UE.

The UE 110 is shown, in FIG. 1, as a mobile device but may include MTC and/or IoT devices. The UE 110 can take the form of portable handsets, smart-phones, personal digital assistants, or any of a number of MTC or IoT devices, although they may be implemented in other form factors. Program applications can be configured to execute on many different types of UEs. For example, a mobile station application can be written to execute on a binary runtime environment for mobile (BREW-based) mobile station, a Windows Mobile based mobile station, ANDROID® based device, IOS device, Java Mobile, or RIM® based mobile station or the like. Some of these types of devices can employ a multi-tasking operating system.

The network 120 provides mobile wireless communications services to the UE 110 as well as to other mobile devices (not shown). The present techniques may be implemented in or used in any of a variety of available mobile networks 120, and the drawing shows only a very simplified example of a few relevant elements of the network 120 for purposes of discussion here. For example, the wireless mobile communication network 120 might be implemented as a network or a series of networks conforming to the LTE standard, the code division multiple access (CDMA) 15-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other advanced standards used for public mobile wireless communications.

Physical elements of a Radio Access Network (RAN) operated by one of the mobile service providers or carriers, include a number of base stations represented in FIG. 1 by the base stations 140, 150 and 160. Although not separately shown, these base stations can include a base transceiver system (BTS), which can communicate via an antennae system at the site of the base station and over the airlink with one or more UEs, when the UE is within range. As shown, base stations 140, 150 and 160 may include eNodeBs in a LTE mobile network or gNodeBs in an advanced next generation network. Each base station can include a BTS coupled to several antennae mounted on a radio tower within a coverage area often referred to as a cell.

Figure 2:
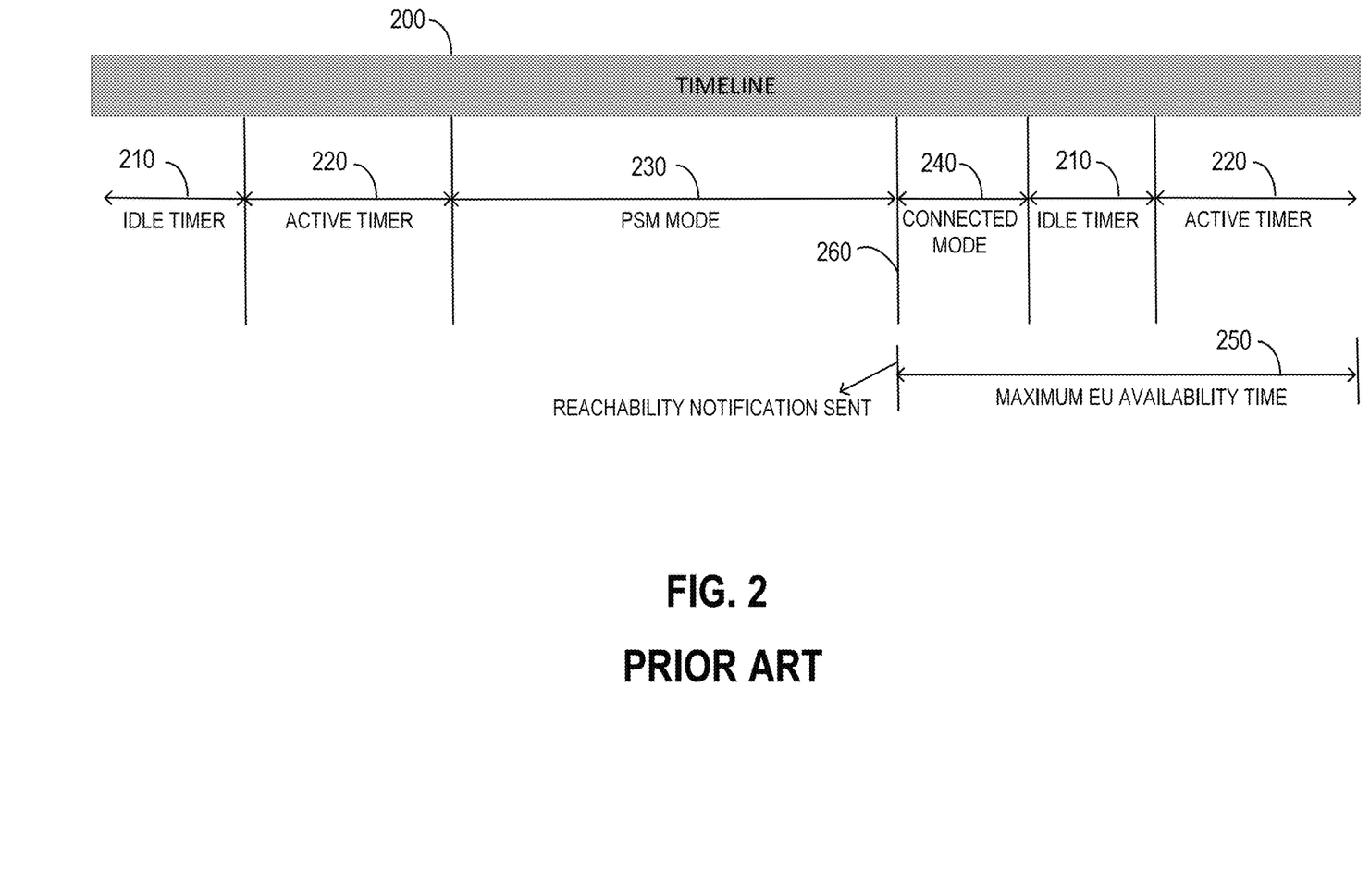
FIG. 2 illustrates a diagram of an example timeline of a user device utilizing one type of power saving function, according to one or more aspects of this disclosure.

As discussed above, most UEs provide multiple power saving functions, which, in one implementation, include PSM and eDRX although other modes such as DRX, Discontinuous Transmission (DTX), and Robust Header Compression (RoHC) may be used. FIG. 2 illustrates a typical timeline 200 for a UE utilizing the PSM power saving function. As can be seen, a typical timeline for a UE utilizing PSM includes multiple idle timers 210, active timers 220, PSM time 230, and connected mode 240. In general, for a UE that is using the PSM function, when the UE becomes idle, it can be reachable during both idle timers 210 and active timers 220. After the period of idle timer 210 and active timer 220 passes, the UE transitions into PSM time 230. The duration of the PSM time 230 varies for each UE depending on many variables, including pre-determined settings of the UE, settings setup by a user, and/or the user's active use of the UE. In general, during PSM time, the UE is not reachable and cannot respond to paging.

Typically, the UE leaves PSM and enters the idle timer 210, when it wakes up and sends a SR or a TAU to its associated eNB, after which the UE becomes reachable, can be paged and can send and receive communication services. During the connected mode 240, the UE is actually connected to the network and is sending and/or receiving communication services. Thus, a UE utilizing PSM, is generally available and reachable during the idle timer 210, active timer 220 and connected time 240. The total of this available time, referred to as the Maximum UE Availability Time is shown in FIG. 2 as Max UE Availability Time 250. In one implementation, once the UE leaves PSM at the time period 260, a UE reachability notification is sent from the MME. In one configuration, the notification also includes the Maximum UE Availability Time. In one implementation, the Maximum UE Availability Time is derived, at least in part, from a timer provided by the UE to the MME during the UE's Attach/TAU requests and other values known internally by the MME. In one implementation, the timer provided by the UE is the active timer and is referred to as T3324. The ide timer may be configured internally in the eNB and/or MME.

Figure 3:
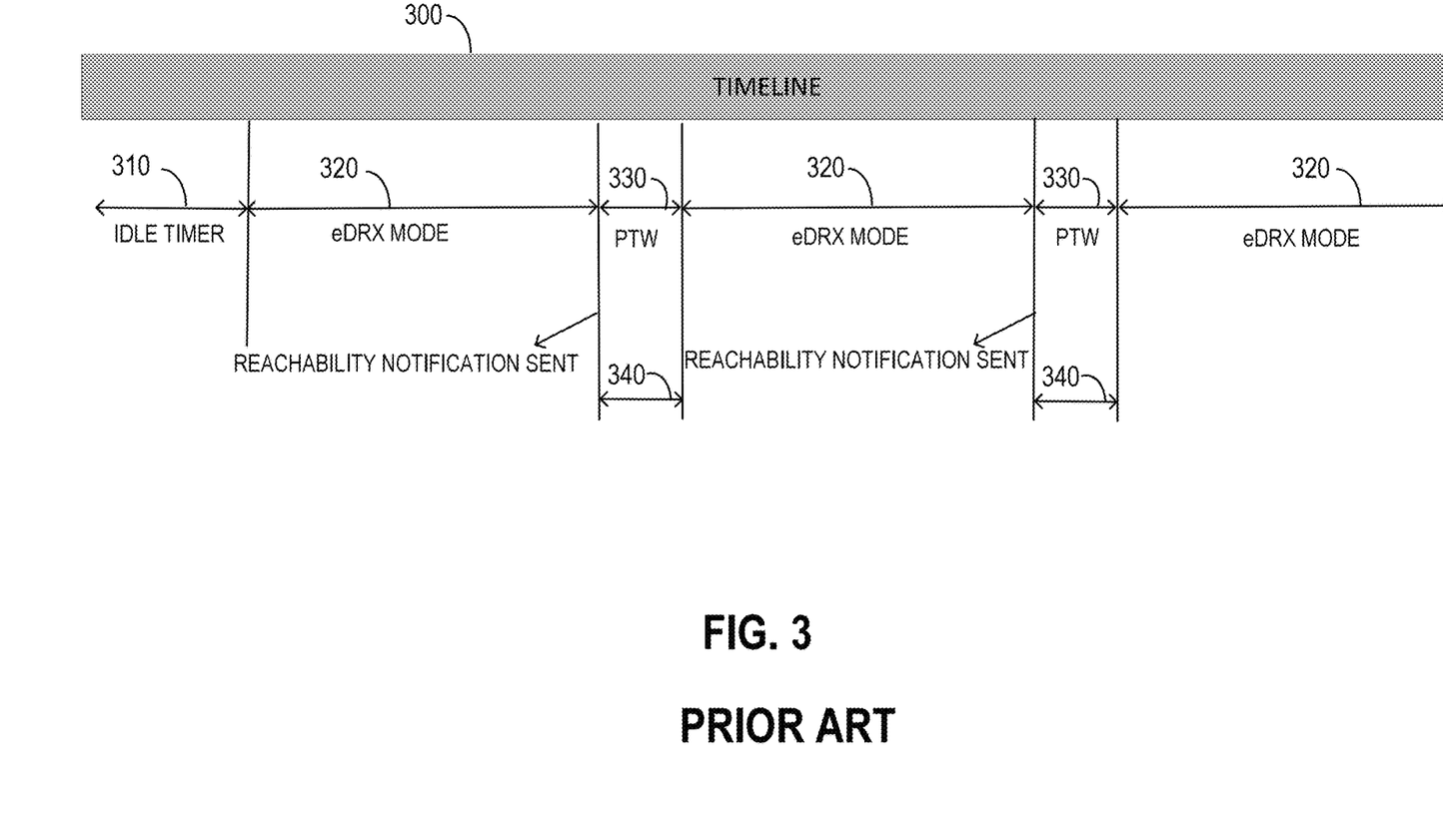
FIG. 3 illustrates a diagram of an example timeline of a user device utilizing another type of power saving function, according to one or more aspects of this disclosure.

FIG. 3 illustrates a typical timeline 300 for a UE utilizing the eDRX power saving function. As can be seen, a typical timeline for a UE utilizing eDRX includes idle timer 310, eDRX modes 320, and PTWs 330. Generally, when in eDRX mode, the UE becomes unreachable until the next PTW. During a PTW, the UE can be paged and therefor it can be reached. Outside of the PTW, however, the UE cannot be reached. Thus, when utilizing the eDRX mode, the UE is only reachable during PTWs. When the UE becomes reachable at PTW 330, a UE reachability notification is generally sent to the network by the MME. This indication includes, in one implementation, the Max UE Availability Time 340.

Typically, a UE cycles more frequently through the eDRX mode and back to PTW than when using the PSM. As a result, numerous notifications need to be sent from the MME for each UE utilizing the eDRX function.

In addition to using PSM and eDRX separately, some UEs can utilize both power saving functions at the same time. Generally, when both PSM and eDRX are used, the UE goes into eDRX mode when the UE is within Active Timer period of PSM. As a result, the MME cannot send a reachability notification with the maximum UE availability time including the Active Timer when the UE enters the idle timer period. Instead, the MME has to send multiple reachability notifications taking into account both PSM and eDRX modes. This significantly increases the number of reachability notifications that need to be sent by the MME. In addition, the maximum UE availability time is significantly reduced even though the active timer period is much longer than when the UE only uses eDRX. As a result, the SCEF and/or AS may not be able to respond in time to send information to the UE. Because of this, there is a significant chance that the SCEF and/or AS are unable to deliver required information to the UE in time. In addition, once the active timer period expires, the UE may not be available again for a number of hours and/or even days. This greatly reduces the efficiency of the system.

Figure 4:
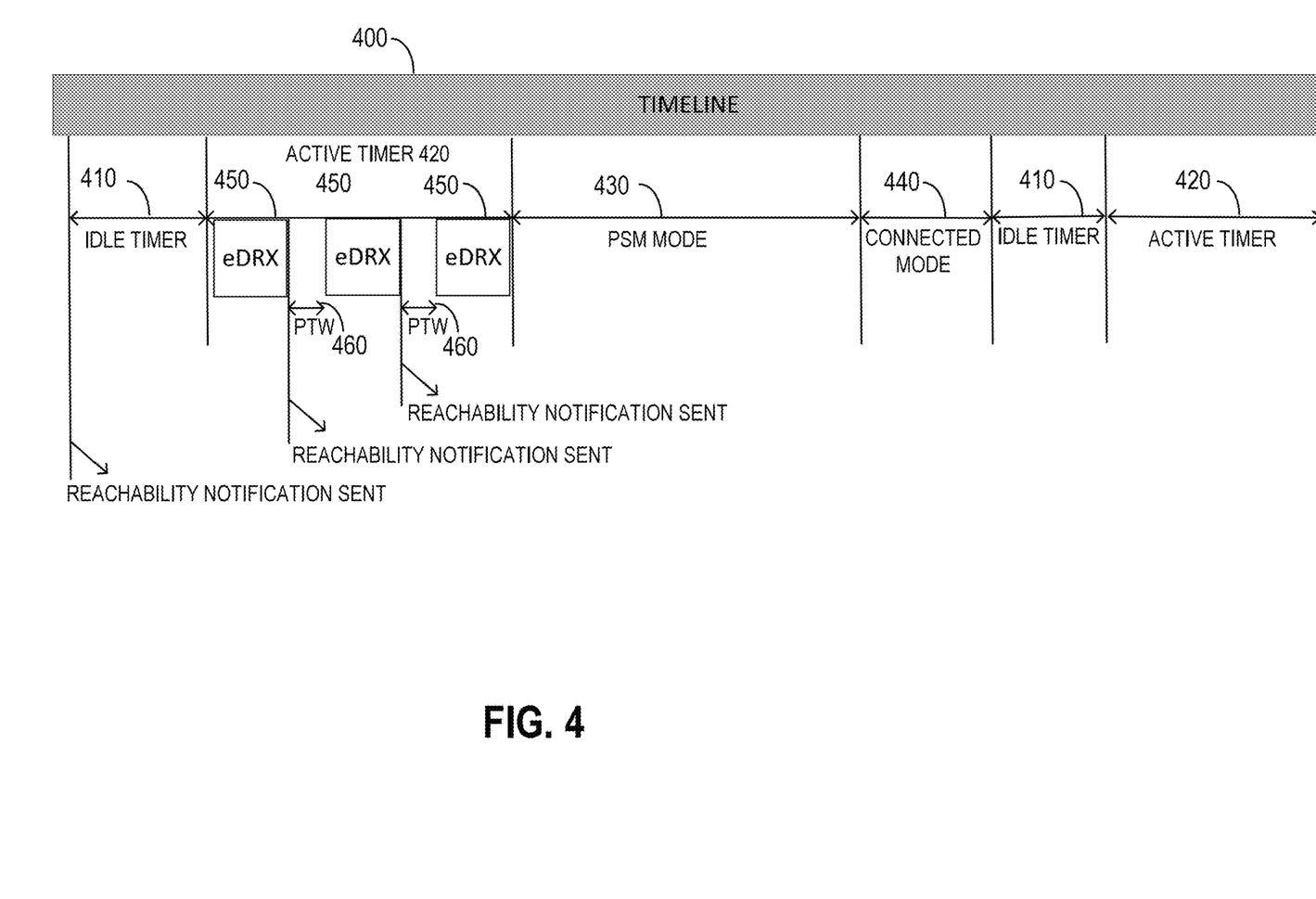
FIG. 4 illustrates a diagram of an example timeline of a user device utilizing two power saving functions at the same time, according to various aspects of this disclosure.

FIG. 4 illustrates a typical timeline 400 for a UE that utilizes both PSM and eDRX functions. Similar to the timeline for the UE using PSM, the timeline 400 includes idle timers 410, active timer 420, PSM mode 430, and connected mode 440. However, timeline 400 also includes time periods 450 during which the UE is in eDRX mode. This generally occurs during the active timer period, because when the device is in PSM, there is no need for another power saving function. As discussed above, while in eDRX mode, the UE is not reachable until a PTW occurs. Thus, when both PSM and eDRX are used, the UE is generally only reachable during PTW periods 460. As a result, each time the UE enters a PTW period during active timer 420, and each time the UE enters idle timer 410, a UE reachability notification may need to be sent. As can be seen from FIG. 4, this significantly increases the number of reachability notifications that need to be sent by the MME. In addition, the maximum UE availability time is significantly reduced.

In the present implementations, various techniques are used to optimize transmission of reachability notifications when the UE is utilizing eDRX or both PSM and eDRX power saving functions. In one implementation, upon being notified that a UE uses both PSM and eDRX, the MME starts keeping track of reachability time periods for the UE for a specific amount of time and/or number of reachability notifications received. The MME then uses the information gathered in this process to calculate or determine a pattern for the reachability of the UE. This pattern identifies when the UE enters active timer periods and how often and what times during each active timer period, the UE enters PTW time periods. After a pattern has been determined, when the UE comes out of PSM mode, the MME sends a single reachability notification to the SCEF. In one implementation, this single notification includes specific future start-timestamps of when the UE can be reached within the active timer period (i.e. when the UE enters PTW time periods within each active time window). This helps the SCEF and/or AS to plan accordingly for sending messages and downlinking data. In one implementation, the reachability notifications include vectors of individual time periods within which the UE is reachable. As a result, the SCEF and/or AS can choose any of the available time periods to send downlink data and/or message(s) as well as be prepared to send downlink data during the future time periods. In one implementation, when the UE transitions into a connected state, the previous reachability notification becomes invalid. Accordingly, the MME will send another reachability notification the next time the UE transitions to the idle state. In one implementation, the new reachability notification is derived using the same procedure as before. As a result, in most cases, the same pattern and Maximum UE Availability time is calculated.

In another implementation, when the UE uses only eDRX, a similar technique may be used. In such instances, when the MME receives notification that a UE is utilizing eDRX, the MME tracks the PTW time periods for the UE over a specific amount of time and/or number of reachability notifications received. The MME then uses the tracked information gathered to calculate and determine a pattern of potential windows for the PTWs and thus for reachability of the UE. This pattern identifies how often and at what times in the future the UE enters PTW time periods. After the pattern has been determined, when the UE enters a first PTW time period, the MME sends a single reachability notification to the SCEF. In one implementation, this single notification includes specific start and end timestamps of when the UE can be reached in the future. In one implementation, the single notification is sufficient until the UE transitions into a connected state. Upon entering the connected state, the notification becomes invalid, thus requiring a next single notification to be sent at the next PTW.

Figure 5:
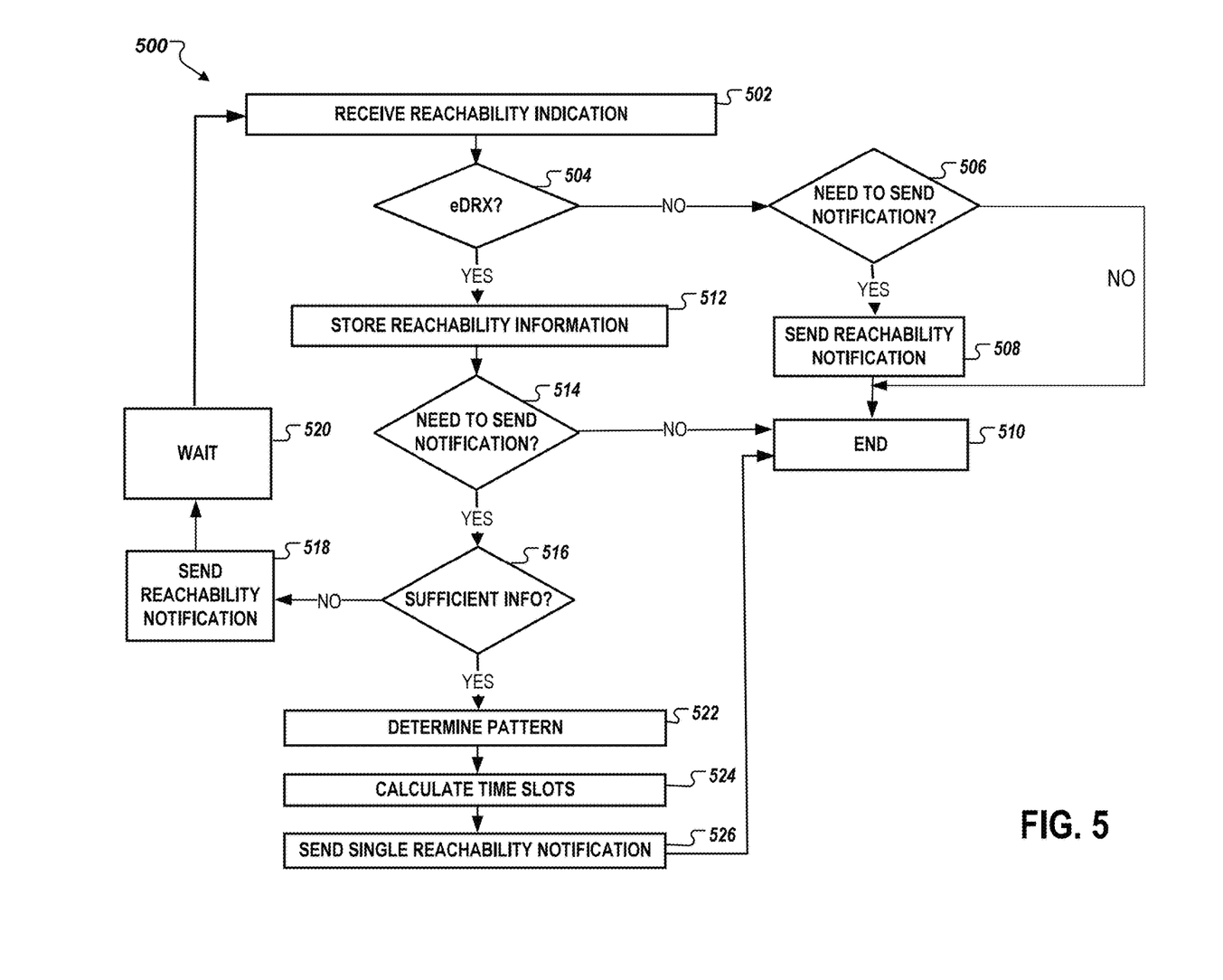
FIG. 5 illustrates one diagram of a flow of example operations for optimizing UE reachability notifications, according to various aspects of this disclosure.

Referring to the drawings, FIG. 5 illustrates a flow diagram depicting an example operation 500 for optimizing UE reachability notifications when the UE is utilizing the PSM and eDRX functions, according to one or more aspects of this disclosure. In one implementation, operation 500 begins at 502 by the MME receiving an indication or becoming aware that the UE is reachable. This may occur, for example, when the UE enters the idle timer state or every time the UE enters a PTW time period. After receiving the indication, operation 500 proceeds to determine if the UE sending the indication is utilizing the eDRX function, at 504. This is achieved, in one implementation, by examining the UE's SR and/or TAU request. In at least one implementation, when the UE is utilizing the eDRX function, the UE indicates support for eDRX by requesting eDRX parameters in its SR and/or TAU request. As a result, by examining the SR and/or TAU request, operation 500 can determine if the UE is utilizing the eDRX function. If it is determined, at this stage, that the UE does not use the eDRX function (i.e., it is only using PSM, is utilizing a different power saving function or is not using a power saving function), operation 500 proceeds to step 506 to determine if there is a need to send a UE notification to a SCEF and/or AS. When it is determined that a notification needs to be sent, for example, because the SCEF has subscribed for reachability notifications, a notification is sent, at 508. In one implementation, the notification includes the reachability time and the maximum UE availability time. Once the notification is sent or if it is determined, at 506, that a notification does not need to be sent, operation 500 proceeds to end, at 510.

Referring back to step 504, if it is determined that the UE is using the eDRX function, then operation 500 stores the time the UE became reachable along with the maximum UE availability time associated with the reachability in a memory of the MME, at 512. The operation then determines, at 514, if a UE reachability notification needs to be sent to the SCEF. This is decided, in one implementation, by determining if a previous attempt by the SCEF to send downlink data failed because of UE unreachability or if SCEF has subscribed for reachability event, and the previous single reachability notification has become invalid. Other situations for sending a reachability notification are also possible. When it is determined that a notification does not need to be sent, operation 500 proceeds to end at 510. This is because, if a notification does not need to be sent, the MME may not need to keep track of and calculate a reachability pattern. In an alternative implementation, even if it is determined that a notification does need to be sent, operation 500 proceeds to gather information needed to calculate a pattern for sending the notification. This may be done by proceeding to step 516 to determine if a specific number of reachability indications have been received for this UE and/or a specific required amount of time has passed. In one implementation, the specific period of time and/or number of reachability notifications is an amount of time or number of reachability notification required to determine a pattern for the UE. The specific period of time and/or number of reachability notifications can be predetermined or may be set as needed by the MME.

When operation 500 determines that the required number of reachability notifications has not been received or the specific amount of time has not been passed, it proceeds to step 518 to send a reachability notification based on the received reachability indication, before moving to step 520 to wait for receiving the next indication of reachability from the UE, at 502, upon which operation 500 starts anew. If, however, it is determined, at 516, that a sufficient number of reachability notifications has been received or the specific amount of time has been passed, operation 500 proceeds to determine the reachability pattern based on the stored reachability information, at 522. In addition to determining the pattern, operation 500 calculates the maximum UE availability time for each PTW, at 524. After the pattern is determined and the maximum UE availability time calculated, the MME has specific start-timestamps and end-timestamps of when the UE can be reached. Subsequently, operation 500 moves to send a single notification to the SCEF/AS, at 526, before proceeding to end at 510. The notification includes, in one embodiment, vectors of individual time periods within which the UE is reachable. In one implementation, the SCEF and/or AS can use this information to decide during which time period to send downlink data and/or message(s) to the UE. For example, the SCEF and/or AS can choose specific time slots for sending data and/or messages to the UE based on efficient real-time spreading out of notification traffic to avoid notification peaks and congestion.

Though discussed for situations when the UE is utilizing both PSM and eDRX, in one implementation, the steps of operation 500 can also be applied to cases where the UE is only using eDRX.

In one implementation, once the pattern has been determined and a single reachability notification has been sent to the SCEF/AS, the notification is valid until the next time the UE transitions into a connected state. As a result, once the single notification has been sent, the next time the MME receives an indication of reachability from the UE, it does not perform any actions with respect to the indication, until after the single reachability notification becomes nullified. Alternatively, the next time the MME receives an indication of reachability from the UE, it proceeds to store it in a database so the information can be used in future calculations/determinations.

By using the above-discussed techniques to optimize transmission of reachability notifications for UEs, the number of reachability notifications that the MME needs to send can be greatly reduced. Additionally, the techniques discussed improve accuracy and efficiency of delivery of downlink data to UEs thus improving the overall performance of both the network and the UE. This is important, particularly, for low cost MTC and IoT devices because without such accuracy and efficiency the cost for a network to support such devices may become prohibitively too high. Additionally, the techniques discussed here help improve coordination between UEs and AS, thus reducing the number of application level failures.

Figure 6:
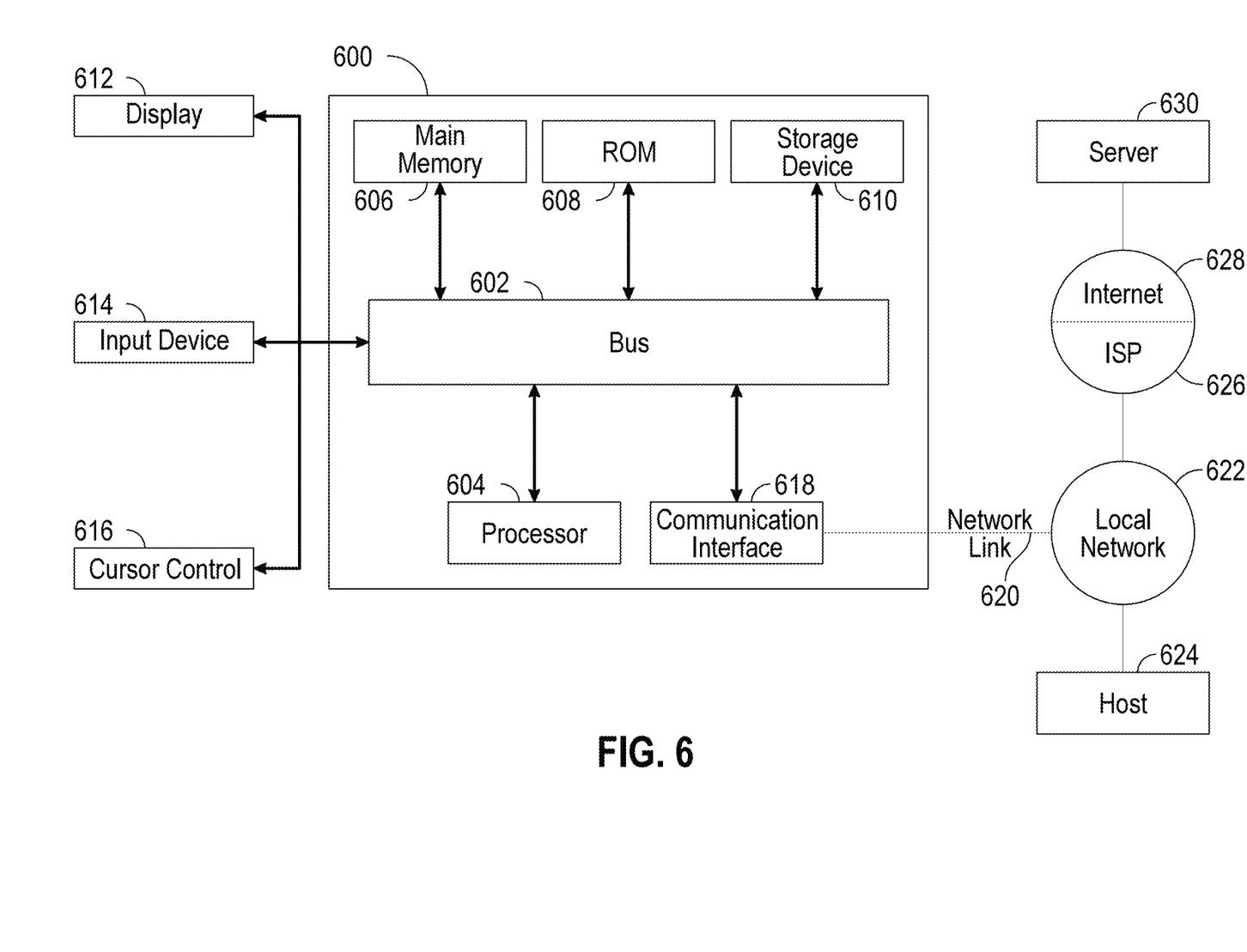
FIG. 6 illustrates a block diagram that illustrates a computer system upon which aspects of this disclosure may be implemented, according to one more aspects of this disclosure.

FIG. 6 is a block diagram illustrating aspects of a computer system 600 upon which aspects of this disclosure may be implemented, including but not limited to the processes according to this disclosure of initiating power saving functions, sending reachability indications, receiving reachability indications, calculating reachability time vectors, and sending a single reachability notification, such as described in reference to FIGS. 2-5. For example, a MME which is used to perform one or more aspects of this disclosure may implement functional blocks, defined and arranged with one another according to the illustrated computer system 600.

Computer system 600 may include a bus 602 or other communication mechanism for communicating information, and a processor 604 coupled with bus 602, and configured to execute computer-executable instructions stored, for example, in a main memory 606. The main memory 606 can be implemented in, and distributed across various system memory resources accessible through the bus 602, including random access memory (RAM) or other types of dynamic storage device. Main memory 606 may be used for storing temporary variables or other intermediate information during execution of instructions by processor 604. Computer system 600 can also include a read only memory (ROM) 608 or other static storage device, and a storage device 610, such as a magnetic disk or optical disk, each coupled to bus 602 for storing static information and instructions for processor 604.

Computer system 600 may be coupled via bus 602 to a display 612, such as a liquid crystal display (LCD), for displaying information to a computer user. An input device 614, including alphanumeric and other keys, or a touch-screen (not separately visible in FIG. 6) can be coupled to bus 602 for communicating information and command selections to processor 604.

Processor 604 can be configured to execute one or more sequences of one or more instructions contained in main memory 606. Such instructions may be read into main memory 606 from another machine-readable medium, such as storage device 610. Execution of the sequences of instructions contained in main memory 606 causes processor 604 to perform at least some of the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH- EPROM, any other memory chip or cartridge, a carrier wave as described hereinafter, or any other medium from which a computer can read.

In some examples implemented using computer system 600, various machine-readable media are involved, for example, in providing instructions to processor 604 for execution. Such media can have various forms, including but not limited to, non-volatile media, volatile media, and transmission media. Non-volatile media can include, for example, optical or magnetic disks. Volatile media can include dynamic memory. Transmission media can include coaxial cables, copper wire and optical fiber, including conductors that implement bus 602. Transmission media can also take the form of acoustic or light waves, such as those generated during radio wave and infrared data communications. All such media must be tangible to enable the instructions carried by the media to be detected by a physical mechanism that reads the instructions into a machine. A cursor control 616, such as a mouse, a trackball, or cursor direction keys, can be included for communicating direction information and command selections to processor 604 and for controlling cursor movement on display 612. The cursor control 616 can provide two degrees of freedom in two axes, a first axis (e.g., x) and a second axis (e.g., y), that allows the device to specify positions in a plane.

Computer system 600 can include a communication interface 618 coupled to bus 602, to provide a two-way data communication coupling through a network link (visible, but not separately numbered) to a local network 622. Network link 620 can provide data communication through one or more networks to other data devices. Network link 620 may provide connection through local network 622 to a host computer 624 or to data equipment operated by an Internet Service Provider (ISP) 626 to access the "Internet" 628, and a server resource 630. Computer system 600 can send messages and receive data, including program code, through the network(s), network link 620 and communication interface 618. The received code can be executed by processor 604 as it is received, and/or stored in storage device 610, or other non-volatile storage for later execution. Computer system 600 may obtain such code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method comprising:
    receiving a plurality of reachability indications from a User Equipment (UE);
    determining if the UE is using a power saving function;
    storing timing information relating to the plurality of reachability indications in memory;
    determining a pattern for reachability of the UE based on the stored timing information;
    calculating a plurality of time periods where the UE is reachable based on the determined pattern; and
    sending a single reachability notification to a network device, the single reachability notification including the plurality of time periods.

2. The method of claim 1, wherein the power saving function is Extended Idle Mode (eDRX) or both eDRX and Power Saving Mode (PSM).

3. The method of claim 1, further comprising determining a maximum UE availability time for each of the plurality of reachability indications.

4. The method of claim 3, wherein the maximum UE availability time is the duration of each Paging Time Window (PTW) time period.

5. The method of claim 1, further comprising determining if a reachability notification needs to be sent to the network device.

6. The method of claim 1, further comprising determining if a specific number of the plurality of reachability indications have been received before determining the reachability pattern.

7. The method of claim 6, wherein the specific number of the plurality of reachability indications is a number of reachability indications necessary to determine the reachability pattern.

8. The method of claim 6, further comprising waiting to receive more reachability indications if it is determined that the specific number of reachability indications has not been received.

9. A system comprising:
one or more processors;
a communication module communicatively coupled to the one or more processors; and
a memory, communicatively coupled to the one or more processors in which are stored instructions that when executed by the one or more processors cause the one or more processors to:
receive a plurality of reachability indications from a UE;
determine if the UE is using a power saving function;
store timing information relating to the plurality of reachability indications in the memory;
determine a pattern for reachability of the UE based on the stored timing information;
calculate a plurality of time periods where the UE is reachable based on the determined pattern; and
send a single reachability notification to a network device, the reachability notification including the plurality of time periods.

10. The system of claim 9, wherein the network device is a Service Capability Exposure Function (SCEF).

11. The system of claim 9, wherein the system is a Mobility Management Entity (MME).

12. The system of claim 9, wherein the power saving function is Extended Idle Mode (eDRX) or both Power Saving Mode (PSM) and eDRX.

13. The system of claim 9, wherein the instructions when executed by the processor further cause the processor to determine a maximum UE availability time for each of the plurality of reachability indications.

14. The system of claim 9, wherein the network device is configured to select one of the plurality of time periods to communicate with the UE.

15. A non-transitory computer readable medium storing instructions that, when executed, cause a programmable device to:
receive a plurality of reachability indications from a User Equipment (UE);
determine if the UE is using a power saving function;
store timing information relating to the plurality of reachability indications in a memory;
determine a pattern for reachability of the UE based on the stored timing information;
calculate a plurality of time periods where the UE is reachable based on the determined pattern; and
send one reachability notification to a network device, the reachability notification including the plurality of time periods.

16. The non-transitory computer readable medium of claim 15, wherein the power saving function is Extended Idle Mode (eDRX), or both Power Saving Mode (PSM) and eDRX.

17. The non-transitory computer readable medium of claim 15, wherein the instructions when executed further cause the programmable device to determine a maximum UE availability time for each of the plurality of reachability indications.

18. The non-transitory computer readable medium of claim 15, wherein the instructions when executed further cause the programmable device to determine if a reachability notification needs to be sent to the network device.

19. The non-transitory computer readable medium of claim 15, wherein the instructions when executed further cause the programmable device to determine if a specific number of reachability indications have been received before determining the reachability pattern.

20. The non-transitory computer readable medium of claim 19, wherein the specific number of reachability indications is a number of reachability indications necessary to determine the reachability pattern.

* * * * *